United States Patent
Chen et al.

(10) Patent No.: US 10,708,018 B2
(45) Date of Patent: Jul. 7, 2020

(54) METHOD AND DEVICE FOR DETERMINING CHANNEL STATE INFORMATION-REFERENCE SIGNAL TRANSMISSION RESOURCE

(71) Applicant: CHINA ACADEMY OF TELECOMMUNICATIONS TECHNOLOGY, Beijing (CN)

(72) Inventors: Wenhong Chen, Beijing (CN); Xueming Pan, Beijing (CN); Qiubin Gao, Beijing (CN); Rakesh Tamrakar, Beijing (CN)

(73) Assignee: CHINA ACADEMY OF TELECOMMUNICATIONS TECHNOLOGY, Beijing (CN)

( * ) Notice: Subject to any disclaimer, the term of this patent is extended or adjusted under 35 U.S.C. 154(b) by 0 days.

(21) Appl. No.: 15/770,156

(22) PCT Filed: Sep. 12, 2016

(86) PCT No.: PCT/CN2016/098696
§ 371 (c)(1),
(2) Date: Apr. 20, 2018

(87) PCT Pub. No.: WO2017/071417
PCT Pub. Date: May 4, 2017

(65) Prior Publication Data
US 2018/0309556 A1    Oct. 25, 2018

(30) Foreign Application Priority Data

Oct. 27, 2015 (CN) .......................... 2015 1 0708555
Nov. 2, 2015 (CN) .......................... 2015 1 0733558

(51) Int. Cl.
*H04L 5/00* (2006.01)
*H04W 72/04* (2009.01)
(Continued)

(52) U.S. Cl.
CPC ......... *H04L 5/0048* (2013.01); *H04B 7/0626* (2013.01); *H04L 5/0051* (2013.01);
(Continued)

(58) Field of Classification Search
CPC ..................................................... H04L 5/0048
See application file for complete search history.

(56) References Cited

U.S. PATENT DOCUMENTS

2011/0034175 A1    2/2011  Takano et al.
2013/0028109 A1    1/2013  Lindom et al.
(Continued)

FOREIGN PATENT DOCUMENTS

CN    101677261 A    3/2010
CN    102595596 A    7/2012
(Continued)

OTHER PUBLICATIONS

International Search Report for PCT/CN2016/098696 dated Jan. 25, 2017 and its English translation provided by WIPO.
(Continued)

*Primary Examiner* — John D Blanton
(74) *Attorney, Agent, or Firm* — Ladas & Parry, LLP

(57) ABSTRACT

A method and a device for determining a CSI-RS transmission resource are provided. The method includes: acquiring, by a UE, uplink/downlink subframe configuration information for determining a position of a CSI-RS resource; determining, by the UE, a type of a subframe within which the CSI-RS is to be transmitted in accordance with the uplink/downlink subframe configuration information; and determining, by the UE, the position of the CSI-RS resource within the subframe within which the CSI-RS is to be transmitted in accordance with the determined type of the subframe.

12 Claims, 1 Drawing Sheet

(51) Int. Cl.
*H04B 7/06* (2006.01)
*H04L 5/14* (2006.01)

(52) U.S. Cl.
CPC ........... *H04L 5/0091* (2013.01); *H04W 72/04* (2013.01); *H04W 72/042* (2013.01); *H04W 72/0446* (2013.01); *H04L 5/14* (2013.01); *H04L 5/1469* (2013.01)

(56) References Cited

U.S. PATENT DOCUMENTS

| | | |
|---|---|---|
| 2013/0034000 A1 | 2/2013 | Huo et al. |
| 2013/0301434 A1 | 11/2013 | Krishnamurthy et al. |
| 2014/0198675 A1 | 7/2014 | He et al. |
| 2014/0282165 A1 | 9/2014 | Tu |
| 2014/0307669 A1 | 10/2014 | Yang et al. |
| 2015/0003301 A1* | 1/2015 | He .................. H04W 76/10 370/280 |
| 2015/0124726 A1 | 5/2015 | Hao et al. |
| 2015/0282165 A1 | 10/2015 | Ni et al. |
| 2015/0318973 A1 | 11/2015 | Wang et al. |

FOREIGN PATENT DOCUMENTS

| | | |
|---|---|---|
| CN | 102684835 A | 9/2012 |
| CN | 103188811 A | 7/2013 |
| CN | 103312439 A | 9/2013 |
| CN | 103347298 A | 10/2013 |
| CN | 103716827 A | 4/2014 |
| EP | 2852084 A1 | 3/2015 |
| WO | 2011088034 A1 | 7/2011 |
| WO | 2012108807 A1 | 8/2018 |

OTHER PUBLICATIONS

Written Opinion of the International Search Authority PCT/CN2016/098696 dated Jan. 25, 2017 and its English translation provided by Google Translate.
First Search for Chinese Application No. 201210370339.1 dated Apr. 22, 2016, with machine English translation provided by Global Dossier.
First Office Action for Chinese Application No. 201210370339.1 dated May 3, 2016, with machine English translation provided by Global Dossier.
Second Office Action for Chinese Application No. 201210370339.1 dated Jan. 3, 2017, with machine English translation provided by Global Dossier.
Supplementary Search for European Application No. 13842272 dated Sep. 22, 2015.
European Search Opinion of the European Patent Office for European Application No. 13842279 dated Sep. 30, 2015.
First Office Action for U.S. Appl. No. 14/431,779 dated May 20, 2016.
Final Office Action for U.S. Appl. No. 14/431,779 dated Sep. 26, 2016.
International Search Report for PCT/CN2013/084426 dated Jan. 25, 2017 and its English translation provided by WIPO.
Written Opinion of the International Search Authority PCT/CN2013/084426 dated Jan. 25, 2017 and its English translation provided by Google Translate.
International Preliminary Report on Patentability PCT/CN2013/084426 dated Jan. 25, 2017 and its English translation provided by Google Translate.
Gatt: "Remaining issues on CQI definition", 3GPP Draft; R1-123215, 3rd Generation Partnership Project (3GPP), Mobile Competence Centre ; 650, Route Des Lucioles; F-06921 Sophia-Antipolis Cedex; France, val. RAN WG1, No. Qingdao, China; Aug. 13, 2012-Aug. 17, 2012 Aug. 5, 2012 (Aug. 5, 2012), XP050661107.
From EPO Application No. 16858853.1, extended European Search Report and Search Opinion dated Aug. 20, 2018.
R1-140065—CATT, "CSI feedback in TDD eIMTA"; 3GPP TSG RAN WG1 Meeting #76; Prague, Czech Republic, Feb. 10-14, 2014; pp. 1-4.
Notification of Reasons for Refusal for JP app. No. 2018521568, dated Jan. 29, 2019, with machine English translation from JPO.
International Preliminary Report on Patentability from PCT/CN2016/098696, dated May 1, 2018, with English translation from WIPO.
Written Opinion of the International Searching Authority from PCT/CN2016/098696, dated Nov. 30, 2016, with English translation from WIPO.
"Remaining Details on CSI-RS Transmission", 3GPP TSG RAN WG1 Meeting #63, Jacksonville, USA, Nov. 15-19, 2010.
"LTE TDD eIMTA CSI reporting requirements", 3GPP TSG-RAN WG4 Meeting #73, San Francisco, CA, US, Nov. 17-21, 2014.

* cited by examiner

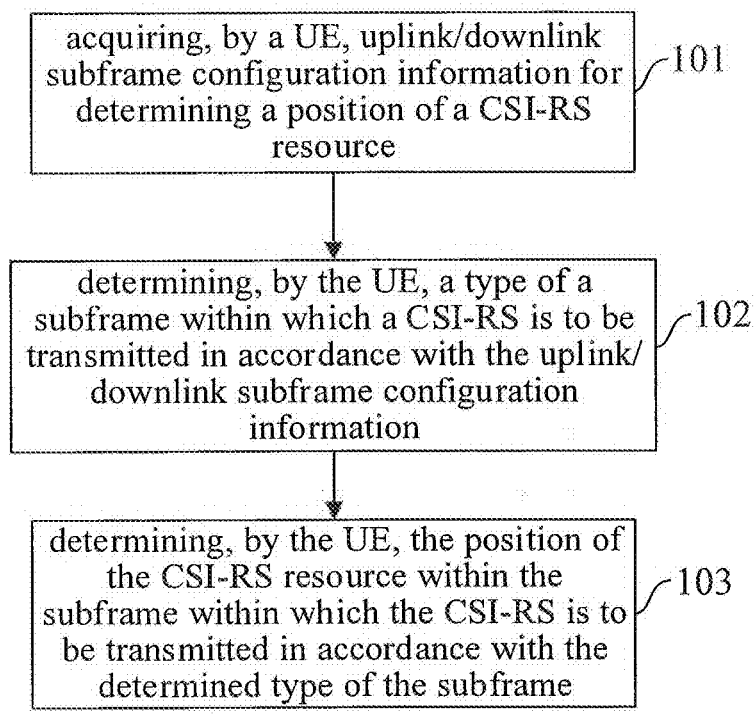

METHOD AND DEVICE FOR DETERMINING CHANNEL STATE INFORMATION-REFERENCE SIGNAL TRANSMISSION RESOURCE

CROSS-REFERENCE TO RELATED APPLICATIONS

The present application is the U.S. national phase of PCT Application No. PCT/CN2016/098696 filed on Sep. 12, 2016, which claims priorities to Chinese patent application No. 201510708555.6 filed on Oct. 27, 2015 and to Chinese patent application No. 201510733558.5 filed on Nov. 2, 2015, the disclosures of which are incorporated herein by reference in their entireties.

TECHNICAL FIELD

The present disclosure relates to the field of wireless communication technology, in particular to a method and a device for determining a Channel State Information-Reference Signal (CSI-RS) transmission resource.

BACKGROUND

In Long Term Evolution (LTE) Release 10, a base station configures a CSI-RS for a User Equipment (UE). Correspondingly, the base station may transmit the CSI-RS within a specific subframe, and the UE may perform channel quality measurement on the basis of the CSI-RS, e.g., measuring a Precoding Matrix Indicator (PMI), a Channel Quality Indicator (CQI) or a Rank Indicator (RI), or performing a rate matching operation.

In a Time Division Duplexing (TDD) system, one radio frame includes a normal uplink subframe, a normal downlink subframe and a special subframe (which is a downlink subframe). All of the normal subframes and the special subframe may be used to transmit the CSI-RS, but different physical resources may be occupied by the CSI-RS within the subframes of different types. Hence, in the case of determining a position of a CSI-RS resource, the UE needs to determine whether or not a subframe within which the CSI-RS is to be transmitted is the special subframe or the normal downlink subframe, and then determine the position of the CSI-RS resource. Usually, a type of the subframe, e.g., the normal downlink subframe or the special subframe, may be determined in accordance with an uplink/downlink subframe configuration. A current LTE system supports various uplink/downlink subframe configurations, and in some cases, it may further support a dynamic change in the uplink/downlink subframe configurations.

Hence, there is an urgent need to determine the position of the CSI-RS resource in accordance with the uplink/downlink subframe configuration.

SUMMARY

(1) Technical Problem to be Solved

An object of the present disclosure is to provide a method and a device for determining a CSI-RS transmission resource, so as to enable a UE to determine a position of the CSI-RS resource in accordance with an uplink/downlink subframe configuration.

(2) Technical Solution

In one aspect, the present disclosure provides in some embodiments a method for determining a CSI-RS transmission resource, including steps of: acquiring, by a UE, uplink/downlink subframe configuration information for determining a position of each CSI-RS resource; determining, by the UE, a type of a subframe within which each CSI-RS is to be transmitted in accordance with the uplink/downlink subframe configuration information; and determining, by the UE, the position of each CSI-RS resource within the subframe within which each CSI-RS is to be transmitted in accordance with the determined type of the subframe.

In a possible embodiment of the present disclosure, the step of acquiring, by the UE, the uplink/downlink subframe configuration information for determining the position of each CSI-RS resource includes: acquiring, by the UE, the uplink/downlink subframe configuration information for determining the position of each CSI-RS resource using one or more types of signaling in accordance with an agreement with a system or UE-specific signaling from a base station.

In a possible embodiment of the present disclosure, the uplink/downlink subframe configuration information for determining the position of the CSI-RS resource is acquired by the UE using one or any combination of: broadcasting signaling from the base station, physical layer downlink signaling from the base station, and UE-specific high-layer signaling from the base station.

In a possible embodiment of the present disclosure, the step of acquiring, by the UE, the uplink/downlink subframe configuration information for determining the position of each CSI-RS resource includes: receiving, by the UE, the UE-specific high-layer signaling from the base station, the UE-specific high-layer signaling being used to indicate the UE to acquire the uplink/downlink subframe configuration information using the broadcasting signaling and/or the physical layer downlink signaling; and acquiring, by the UE, the uplink/downlink subframe configuration information using the broadcasting signaling and/or the physical layer downlink signaling in accordance with the UE-specific high-layer signaling.

In a possible embodiment of the present disclosure, one or more types of subframes within which the CSI-RSs are to be transmitted are determined by the UE in accordance with the uplink/downlink subframe configuration information.

In a possible embodiment of the present disclosure, the step of determining, by the UE, the position of each CSI-RS resource within the subframe within which each CSI-RS is to be transmitted in accordance with the determined type of the subframe includes: in the case that one type of subframe within which the CSI-RS is to be transmitted is determined by the UE in accordance with the uplink/downlink subframe configuration information, determining, by the UE, the position of each CSI-RS resource in accordance with the one type of the subframe within which the CSI-RS is to be transmitted.

In a possible embodiment of the present disclosure, the step of determining, by the UE, the position of each CSI-RS resource within the subframe within which the CSI-RS is to be transmitted in accordance with the determined type of the subframe includes: in the case that two or more types of subframes within which the CSI-RSs are to be transmitted are determined by the UE in accordance with the uplink/downlink subframe configuration information, determining, by the UE, the position of each CSI-RS resource in accordance with each type of the subframe, so as to acquire a set of positions of the CSI-RS resources corresponding to each type of the subframe; and determining, by the UE, the set of the positions of the CSI-RS resources corresponding to each type of the subframe to be the position of the CSI-RS resource for receiving or measuring a downlink signal.

In a possible embodiment of the present disclosure, the method further includes: subsequent to the step of determining, by the UE, the set of the positions of the CSI-RS resources corresponding to each type of the subframe to be the position of the CSI-RS resource for receiving or measuring the downlink signal, acquiring, by the UE, a union of the sets of the positions of the CSI-RS resources corresponding to the types of the subframes, and receiving or measuring the downlink signal in accordance with the union; or receiving or measuring, by the UE, the downlink signal in accordance with the set of the positions of the CSI-RS resources corresponding to each type of subframe.

In a possible embodiment of the present disclosure, the subframe within which the CSI-RS is to be transmitted is a seventh subframe of a radio subframe.

In a possible embodiment of the present disclosure, the CSI-RS includes a zero-power CSI-RS and/or a non-zero-power CSI-RS, and the determined type of subframe includes at least one of a normal uplink subframe, a normal downlink subframe and a special subframe.

In another aspect, the present disclosure provides in some embodiments a UE, including: a processor; a memory connected to the processor via a bus interface and configured to store therein programs and data for the operation of the processor; and a transceiver configured to be in communication with any other devices over a transmission medium. The processor is configured to call and execute the programs and the data stored in the memory to: acquire uplink/downlink subframe configuration information for determining a position of a Channel State Information-Reference Signal (CSI-RS) resource; determine a type of a subframe within which a CSI-RS is to be transmitted in accordance with the uplink/downlink subframe configuration information; and determine the position of the CSI-RS resource within the subframe within which the CSI-RS is to be transmitted in accordance with the determined type of the subframe.

In a possible embodiment of the present disclosure, the processor is further configured to call and execute the programs and the data stored in the memory to: determine the uplink/downlink subframe configuration information for determining the position of each CSI-RS resource using one or more types of signaling in accordance with an agreement with a system or UE-specific signaling from a base station.

In a possible embodiment of the present disclosure, the processor is further configured to call and execute the programs and the data stored in the memory to: acquire the uplink/downlink subframe configuration information using one or any combination of: broadcasting signaling from the base station, physical layer downlink signaling from the base station, and UE-specific high-layer signaling from the base station.

In a possible embodiment of the present disclosure, the processor is further configured to call and execute the programs and the data stored in the memory to: receive the UE-specific high-layer signaling from the base station, the UE-specific high-layer signaling being used to indicate the UE to acquire the uplink/downlink subframe configuration information using the broadcasting signaling and/or the physical layer downlink signaling; and acquire the uplink/downlink subframe configuration information using the broadcasting signaling and/or the physical layer downlink signaling in accordance with the UE-specific high-layer signaling.

In a possible embodiment of the present disclosure, one or more types of subframes within which the CSI-RSs are to be transmitted are determined by the processor in accordance with the uplink/downlink subframe configuration information.

In a possible embodiment of the present disclosure, the processor is further configured to call and execute the programs and the data stored in the memory to, in the case that one type of subframe within which the CSI-RS is to be transmitted is determined by the processor in accordance with the uplink/downlink subframe configuration information, determine the position of each CSI-RS resource in accordance with the one type of the subframe within which the CSI-RS is to be transmitted.

In a possible embodiment of the present disclosure, the processor is further configured to call and execute the programs and the data stored in the memory to: in the case that two or more types of subframes within which the CSI-RSs are to be transmitted are determined by the processor in accordance with the uplink/downlink subframe configuration information, determine the position of each CSI-RS resource in accordance with each type of the subframe, so as to acquire a set of positions of the CSI-RS resources corresponding to each type of the subframe; and determine the set of the positions of the CSI-RS resources corresponding to each type of the subframe to be the position of the CSI-RS resource for receiving or measuring a downlink signal.

In a possible embodiment of the present disclosure, the processor is further configured to call and execute the programs and the data stored in the memory to, subsequent to determining, by the processor, the set of the positions of the CSI-RS resources corresponding to each type of the subframe to be the position of the CSI-RS resource for receiving or measuring the downlink signal, acquire a union of the sets of the positions of the CSI-RS resources corresponding to the types of the subframes, and receive or measure the downlink signal in accordance with the union; or receive or measure the downlink signal in accordance with the set of the positions of the CSI-RS resources corresponding to each type of subframe.

In a possible embodiment of the present disclosure, the subframe within which the CSI-RS is to be transmitted is a seventh subframe of a radio subframe.

In a possible embodiment of the present disclosure, the CSI-RS includes a zero-power CSI-RS and/or anon-zero-power CSI-RS, and the determined type of subframe includes at least one of a normal uplink subframe, a normal downlink subframe and a special subframe.

(3) Beneficial Effect

According to the embodiments of the present disclosure, the UE determines the type of the subframe within which the CSI-RS is to be transmitted in accordance with the uplink/downlink subframe configuration information from the base station, and determines the position of the CSI-RS resource within the subframe in accordance with the type of the subframe. As a result, it is able for the UE to determine the position of the CSI-RS resource in accordance with the uplink/downlink subframe configuration information.

BRIEF DESCRIPTION OF THE DRAWINGS

In order to illustrate the technical solutions of the present disclosure or the prior art in a clearer manner, the drawings desired for the present disclosure or the prior art will be described hereinafter briefly. Obviously, the following drawings merely relate to some embodiments of the present disclosure, and based on these drawings, a person skilled in the art may obtain other drawings without any creative effort.

FIG. 1 is a flow char of a method for determining a CSI-RS transmission resource according to one embodiment of the present disclosure;

FIG. 2 is a schematic view showing a UE according to one embodiment of the present disclosure; and FIG. 3 is another schematic view showing the UE according to one embodiment of the present disclosure.

DETAILED DESCRIPTION OF THE EMBODIMENTS

The present disclosure will be described hereinafter in conjunction with the drawings and embodiments. The following embodiments are for illustrative purposes only, but shall not be used to limit the scope of the present disclosure.

In order to make the objects, the technical solutions and the advantages of the present disclosure more apparent, the present disclosure will be described hereinafter in a clear and complete manner in conjunction with the drawings and embodiments. Obviously, the following embodiments merely relate to a part of, rather than all of, the embodiments of the present disclosure, and based on these embodiments, a person skilled in the art may, without any creative effort, obtain the other embodiments, which also fall within the scope of the present disclosure.

Unless otherwise defined, any technical or scientific term used herein shall have the common meaning understood by a person of ordinary skills. Such words as "first" and "second" used in the specification and claims are merely used to differentiate different components rather than to represent any order, number or importance. Similarly, such words as "one" or "one of" are merely used to represent the existence of at least one member, rather than to limit the number thereof. Such words as "connect" or "connected to" may include electrical connection, direct or indirect, rather than to be limited to physical or mechanical connection. Such words as "on", "under", "left" and "right" are merely used to represent relative position relationship, and when an absolute position of the object is changed, the relative position relationship will be changed too.

In order to illustrate the technical solutions of the present disclosure in a clearer manner, the present disclosure will be described in details associating with the drawings. Obviously, the following embodiments merely relate to some embodiments of the present disclosure rather than all of embodiments of the present disclosure, and based on these embodiments, a person skilled in the art may obtain other embodiments without any creative effort, which also falls within the scope of the present disclosure.

The present disclosure provides in some embodiments a method for determining a CSI-RS transmission resource which, as shown in FIG. 1, includes the following Steps 101 to 103.

Step 101: acquiring, by a UE, uplink/downlink subframe configuration information for determining a position of CSI-RS resource.

To be specific, the UE may acquire the uplink/downlink subframe configuration information for determining the position of the CSI-RS resource using one or more types of signaling in accordance with an agreement with a system or UE-specific signaling from a base station.

To be specific, the base station may notify the uplink/downlink subframe configuration information of the UE in one of the following modes.

In Mode 1, the base station may notify the uplink/downlink subframe configuration information of the UE via broadcasting signaling.

In Mode 2, the base station may notify the uplink/downlink subframe configuration information of the UE via physical layer downlink signaling, and the physical layer downlink signaling may be Downlink Control Information (DCI) carried on a Physical Downlink Control Channel (PDCCH).

In Mode 3, the base station may notify the uplink/downlink subframe configuration information of the UE via high-layer signaling. Correspondingly, the high-layer signaling is used to indicate the uplink/downlink subframe configuration information of the UE using the broadcasting signaling or the physical layer downlink signaling.

The base station may notify the uplink/downlink subframe configuration information of the UE in any of the above-mentioned modes or a combination thereof. For example, in a scenario where a dynamic TDD transmission mechanism is allowed, the base station may notify the uplink/downlink subframe configuration information of the UE merely via the broadcasting signaling. For another example, in a scenario where the dynamic TDD transmission mechanism is allowed, the base station may notify the UE of the uplink/downlink subframe configuration information via the broadcasting signaling, and subsequently indicate one uplink/downlink subframe configuration via dynamic signaling of physical layer (e.g., DCI). Correspondingly, the UE may transmit and receive data in accordance with the dynamically-indicated uplink/downlink subframe configuration.

Correspondingly, the UE may acquire the uplink/downlink subframe configuration information via one or any combination of: the broadcasting signaling from the base station, the physical layer downlink signaling from the base station, and the UE-specific high-layer signaling from the base station.

For example, based on the agreement with the system, the UE may determine the position of the CSI-RS resource in accordance with merely the uplink/downlink subframe configuration information acquired from the broadcasting signaling. Alternatively, based on the agreement with the system, the UE may determine the position of the CSI-RS resource in accordance with merely the uplink/downlink subframe configuration information acquired from the DCI. Alternatively, based on the agreement with the system, the UE may determine the position of the CSI-RS resource in accordance with the uplink/downlink subframe configuration information acquired from the broadcasting signaling and the physical layer downlink signaling. For another example, the base station may notify, through UE-specific Radio Resource Control (RRC) signaling, the UE to determine the position of the CSI-RS resource in accordance with the uplink/downlink subframe configuration information acquired from the broadcasting signaling or the physical layer downlink signaling.

The UE may acquire the uplink/downlink subframe configuration information via the UE-specific high-layer signaling from the base station. To be specific, the UE may receive the UE-specific high-layer signaling transmitted from the base station, and the UE-specific high-layer signaling is used to indicate the UE to acquire the uplink/downlink subframe configuration information via the broadcasting signaling, the physical layer downlink signaling, or both. Then, the UE may acquire the uplink/downlink subframe configuration information via the broadcasting signaling or the physical layer downlink signaling in accordance with the indication contained in the UE-specific high-layer signaling.

Step 102: determining, by the UE, a type of a subframe within which the CSI-RS is to be transmitted in accordance with the uplink/downlink subframe configuration information acquired in Step 101.

For example, in the case that each period is 5 ms, the base station may transmit the CSI-RS within every 5 subframes. The UE may merely determine a type of a specific subframe (i.e., the subframe within which the CSI-RS is to be transmitted) in a mode defined herein, and then determine the position of the CSI-RS resource. Usually, the CSI-RS resource has a fixed position within each of the subframes of an identical type. However, the position of the CSI-RS resource in the subframes may also be dynamically variable according to the practical need. The present disclosure is not particularly defined herein.

One or more types of subframes within which the CSI-RSs are to be transmitted may be determined by the UE in accordance with the uplink/downlink subframe configuration information. For example, in the case that the UE acquires the uplink/downlink subframe configuration information merely via one of the broadcasting signaling, the physical layer downlink signaling and the high-layer signaling from the base station, the UE may determine that there is merely one type of subframe within which the CSI-RS is to be transmitted. In the case that the UE acquires the uplink/downlink subframe configuration information via more than one of the broadcasting signaling, the physical layer downlink signaling and the high-layer signaling from the base station, and the UE is notified of an identical uplink/downlink subframe configuration via these types of signaling, the UE may also determine that there is merely one type of subframe within which the CSI-RS is to be transmitted. In the case that the UE acquires the uplink/downlink subframe configuration information via more than one of the broadcasting signaling, the physical layer downlink signaling and the high-layer signaling from the base station, but the UE is notified of different uplink/downlink subframe configurations via these types of signaling, the UE may determine that there may be various types of subframes within which the CSI-RS is to be transmitted.

An LTE system capable of supporting seven different uplink/downlink subframe configurations may be taken as an example. In Table 1, U represents a normal uplink subframe, D represents a normal downlink subframe, and S represents a special subframe.

TABLE 1

| Identifier of uplink/ downlink configuration | Uplink/ downlink conversion period | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Table 1 may be preconfigured for the base station and the UE. In the case of notifying the uplink/downlink subframe configuration information of the UE, the base station may merely transmit a corresponding identifier of the uplink/downlink subframe configuration in Table 1. Then, the UE may acquire the corresponding uplink/downlink subframe configuration information in accordance with the identifier of the uplink/downlink configuration.

Step 103: determining, by the UE, the position of the CSI-RS resource within the subframe within which the CSI-RS is to be transmitted in accordance with the determined type of the subframe.

In the case that merely one type of subframe within which the CSI-RS is to be transmitted is determined by the UE in accordance with the uplink/downlink subframe configuration information, the UE may determine the position of the CSI-RS resource in accordance with the one type of the subframe within which the CSI-RS is to be transmitted.

In addition, in the case that two or more types of subframes within which the CSI-RSs are to be transmitted are determined by the UE in accordance with the uplink/downlink subframe configuration information, the UE may determine the position of the CSI-RS resource in accordance with each type of the subframe so as to acquire a set of positions of the CSI-RS resources corresponding to each type of the subframe, and determine the set of the positions of the CSI-RS resources corresponding to each type of the subframe to be the position of the CSI-RS resource for receiving or measuring a downlink signal.

Further, subsequent to determining the set of the positions of the CSI-RS resources corresponding to each type of the subframe to be the position of the CSI-RS resource for receiving or measuring the downlink signal, the UE may receive or measure the downlink signal in the following two modes.

Mode 1: the UE may acquire a union of the sets of the positions of the CSI-RS resources corresponding to the types of the subframes, and receive or measure the downlink signal in accordance with the union. Mode 2: the UE may receive or measure the downlink signal in accordance with the set of the positions of the CSI-RS resources corresponding to each type of subframe.

For example, in the case that a normal subframe corresponds to a set A of the positions of the CSI-RS resources, a special subframe corresponds to a set B of the positions of the CSI-RS resources and the UE receives or measures the downlink signal in the mode 1 (i.e., a union C of the set A and the second B is acquired as the set of the positions of the CSI-RS resources), the UE may receive or measure the downlink signal according to the set C, so as to acquire a measurement result. In the case that the UE receives or measures the downlink signal in mode 2 (i.e., the UE receives or measures the downlink signal according to the set A and the UE receives or measures the downlink signal according to the set B), two measurement results corresponding to the set A and the set B respectively may be acquired.

Taking a LTE system supporting seven different uplink/downlink subframe configurations as an example, subframe 6 (for a radio subframe, the number of subframes starts from 0, so subframe 6 represents a seventh subframe) have different types in different uplink/downlink subframe configurations. For example, in an uplink/downlink subframe configuration 0, subframe 6 is a special subframe, and for another example, in an uplink/downlink subframe configuration 3, subframe 6 is a normal downlink subframe. The other subframes, e.g., subframe 0, are normal downlink subframes in different uplink/downlink subframe configurations. In other words, the UE may determine, in accordance with the uplink/downlink subframe configuration information, that merely subframe 6 within which the CSI-RS is to be transmitted is of various types. As a result, it is able to determine the position of the CSI-RS resource within subframe 6 using the above-mentioned method.

The CSI-RS includes a zero-power (ZP) CSI-RS, a non-zero-power (NZP) CSI-RS or both. In the LTE system, the base station may configure two types of CSI-RSs for the UE, i.e., the NZP CSI-RS and the ZP CSI-RS. The NZP CSI-RS is used for the downlink CSI-RS measurement by the UE, and the ZP CSI-RS is used to indicate to the UE that physical resources which are incapable of being used for data transmission, so as to perform a rate matching operation.

According to the embodiments of the present disclosure, the UE may determine the type of the subframe within which the CSI-RS is to be transmitted in accordance with the uplink/downlink subframe configuration notified by the base station, and then determine the position of the CSI-RS resource within the subframe in accordance with the type of the subframe. As a result, it is able for the UE to, in the case that the base station indicates the uplink/downlink subframe configurations of the UE via various signaling and the uplink/downlink subframe configurations are different from each other, determine the type of the subframe within which the CSI-RS is to be transmitted and determine the position of the CSI-RS resource within the subframe within which the CSI-RS is to be transmitted in a better manner.

For ease of understanding, the present disclosure will be described hereinafter in more details in conjunction with a specific application scenario.

The UE may acquire the uplink/downlink subframe configuration information via the broadcasting signaling from the base station, and determine, in accordance with the uplink/downlink subframe configuration information, that the type of subframe within which the CSI-RS is to be transmitted is an uplink/downlink configuration 1 in Table 1. At this time, subframe 1 and subframe 6 are special subframes, and the other subframes are normal subframes. In the case that the UE is capable of supporting a dynamic TDD function (i.e., the UE may acquire the uplink/downlink subframe configuration from the base station via the dynamic signaling of the physical layer), the uplink/downlink subframe configuration indicated via the dynamic signaling of the physical layer may be identical to, or different from, the uplink/downlink subframe configuration indicated via the broadcasting signaling. In the case that an uplink/downlink configuration 3 in Table 1 is indicated via the dynamic signaling of the physical layer, subframe 1 may be a special subframe, and the other subframes may be normal subframes.

Example 1: in the case that the uplink/downlink subframe configuration indicated via the dynamic signaling of the physical layer is different from the uplink/downlink subframe configuration indicated via the broadcasting signaling, the UE may determine the position of the CSI-RS resource within the subframe within which the CSI-RS is to be transmitted in accordance with the uplink/downlink subframe configuration indicated via the signaling agreed with the base station, or the UE may receive 1-bit RRC signaling from the base station and determine the uplink/downlink subframe configuration indicated via the dynamic signaling of the physical layer or the broadcasting signaling according to the 1-bit RRC signaling, so as to determine the position of the CSI-RS resource within the subframe within which the CSI-RS is to be transmitted.

In the case that the UE determines, based on an agreement with the base station or based on the RRC signaling from the base station, the position of the CSI-RS resource within the subframe within which the CSI-RS is to be transmitted in accordance with the uplink/downlink subframe configuration indicated via the broadcasting signaling, the UE may determine subframe 6 to be a special subframe in accordance with the uplink/downlink configuration 1. Next, the UE may determine the position of the CSI-RS resource within subframe 6 in accordance with a position of the current CSI-RS resource within a special subframe, and then perform downlink channel measurement or downlink interference measurement within subframe 6 in accordance with the determined position of the CSI-RS resource.

Example 2: in the case that the uplink/downlink subframe configuration indicated via the dynamic signaling of the physical layer is different from the uplink/downlink subframe configuration indicated via the broadcasting signaling, the UE may determine the position of the CSI-RS resource within the subframe within which the CSI-RS is to be transmitted in accordance with the uplink/downlink subframe configuration indicated via the dynamic signaling of the physical layer, and determine the position of the CSI-RS resource within the subframe within which the CSI-RS is to be transmitted in accordance with the uplink/downlink subframe configuration indicated via the broadcasting signaling.

The UE may determine subframe 6 to be a special subframe in accordance with the uplink/downlink subframe configuration 1 indicated via the broadcasting signaling, and determine the set A of the CSI-RS resources within subframe 6 in accordance with the positions of the current CSI-RS resources within the special subframe. In addition, the UE may determine subframe 6 to be a normal subframe in accordance with the uplink/downlink subframe configuration 3 indicated via the dynamic signaling of the physical layer, and determine the set B of the CSI-RS resources within subframe 6 in accordance with the positions of the current CSI-RS resources within the normal subframe.

In the case that the CSI-RS is a ZP CSI-RS, the UE may determine the sets A and B to be the positions of the ZP CSI-RS resources. At this time the UE may not perform the downlink channel measurement on physical resources corresponding to the sets A and B, or may perform the downlink interference measurement on the physical resources corresponding to the sets A and B.

In addition, in the case that the CSI-RS is an NZP CSI-RS, the UE may perform the downlink channel measurement on the sets A and B, and acquire the downlink CSI in accordance with a measurement result.

The present disclosure further provides in some embodiments a UE which, as shown in FIG. 2, includes an acquisition unit 201, a first determination unit 202, a second determination unit 203 and a signal processing unit 204. The acquisition unit 201 is configured to acquire uplink/downlink subframe configuration information for determining a position of the CSI-RS resource. The first determination unit 202 is configured to determine a type of a subframe within which the CSI-RS is to be transmitted in accordance with the uplink/downlink subframe configuration information. The second determination unit 203 is configured to determine the position of the CSI-RS resource within the subframe within which the CSI-RS is to be transmitted in accordance with the determined type of the subframe. The signal processing unit 204 is configured to: receive or measure the downlink signal in accordance with a union of the sets of the positions of the CSI-RS resources corresponding to the types of the subframes; or receive or measure the downlink signal in accordance with the set of the positions of the CSI-RS resources corresponding to each type of subframe.

In a possible embodiment of the present disclosure, the acquisition unit 201 is further configured to acquire the uplink/downlink subframe configuration information for determining the position of the CSI-RS resource using one or more types of signaling in accordance with an agreement with a system or UE-specific signaling from a base station.

The base station may notify the uplink/downlink subframe configuration information of the UE in one of the following modes. In Mode 1, the base station may notify the uplink/downlink subframe configuration information of the UE via broadcasting signaling. In Mode 2, the base station may notify the uplink/downlink subframe configuration information of the UE via physical layer downlink signaling, and the physical layer downlink signaling may be DCI carried on a PDCCH. In Mode 3, the base station may notify the uplink/downlink subframe configuration information of the UE via high-layer signaling. The high-layer signaling is used to notify the uplink/downlink subframe configuration information of the UE using the broadcasting signaling or the physical layer downlink signaling.

The base station may notify the uplink/downlink subframe configuration information of the UE in any of the above-mentioned modes or a combination thereof. For example, in a scenario where a dynamic TDD transmission mechanism is prohibited, the base station may notify the uplink/downlink subframe configuration information of the UE merely via the broadcasting signaling. For another example, in a scenario where the dynamic TDD transmission mechanism is allowed, the base station may notify the uplink/downlink subframe configuration information of the UE via the broadcasting signaling, and subsequently indicate one uplink/downlink subframe configuration via dynamic signaling of the physical layer (e.g., DCI). Correspondingly, the UE may transmit and receive data in accordance with the dynamically-indicated uplink/downlink subframe configuration.

Correspondingly, the acquisition unit 201 is further configured to acquire the uplink/downlink subframe configuration information for determining the position of the CSI-RS resource using one or any combination of: broadcasting signaling from the base station, physical layer downlink signaling from the base station, and UE-specific high-layer signaling from the base station.

For example, based on the agreement with the system, the UE may determine the position of the CSI-RS resource in accordance with the uplink/downlink subframe configuration information acquired from the broadcasting signaling. Alternatively, based on the agreement with the system, the UE may determine the position of the CSI-RS resource in accordance with merely the uplink/downlink subframe configuration information acquired from the DCI. Alternatively, based on the agreement with the system, the UE may determine the position of the CSI-RS resource in accordance with the uplink/downlink subframe configuration information acquired from the broadcasting signaling and the DCI. For another example, the base station may notify, through UE-specific RRC signaling, the UE to determine the position of the CSI-RS resource in accordance with the uplink/downlink subframe configuration information acquired from the broadcasting signaling or the DCI.

In a possible embodiment of the present disclosure, the acquisition unit acquiring the uplink/downlink subframe configuration information through UE-specific high-layer signaling from a base station comprises: the acquisition unit receives the UE-specific high-layer signaling from the base station, the UE-specific high-layer signaling being used to indicate the acquisition unit to acquire the uplink/downlink subframe configuration information using the broadcasting signaling, the physical layer downlink signaling or both; and the acquisition unit acquires the uplink/downlink subframe configuration information using the broadcasting signaling or the physical layer downlink signaling in accordance with the UE-specific high-layer signaling.

To be specific, one or more types of subframes within which the CSI-RSs are to be transmitted are determined by the first determination unit 202 in accordance with the uplink/downlink subframe configuration information. For example, in the case that the acquisition unit 201 acquires the uplink/downlink subframe configuration information merely via one of the broadcasting signaling, the physical layer downlink signaling and the high-layer signaling from the base station, the first determination unit 202 may determine that there is merely one type of subframe within which the CSI-RS is to be transmitted. In addition, in the case that the acquisition unit 201 acquires the uplink/downlink subframe configuration information via more than one of the broadcasting signaling, the physical layer downlink signaling and the high-layer signaling from the base station, and the UE is notified of an identical uplink/downlink subframe configuration via these pieces of signaling, the first determination unit 202 may also determine that there is merely one type of subframe within which the CSI-RS is to be transmitted. In the case that the acquisition unit 201 acquires the uplink/downlink subframe configuration information via more than one of the broadcasting signaling, the physical layer downlink signaling and the high-layer signaling from the base station, but the UE is notified of different uplink/downlink subframe configurations via these types of signaling, the first determination unit 202 may determine that there are various types of subframes within which the CSI-RS is to be transmitted.

In the case that one type of subframe within which the CSI-RS is to be transmitted is determined by the first determination unit 202 in accordance with the uplink/downlink subframe configuration information, the second determination unit 203 may determine the position of the CSI-RS resource in accordance with the one type of the subframe within which the CSI-RS is to be transmitted.

In the case that two or more types of subframes within which the CSI-RSs are to be transmitted are determined by the first determination unit 202 in accordance with the uplink/downlink subframe configuration information, the second determination unit 203 may determine the position of the CSI-RS resource in accordance with each type of the subframe, so as to acquire a set of positions of the CSI-RS resources corresponding to each type of the subframe, and determine the set of the positions of the CSI-RS resources corresponding to each type of the subframe to be the position of the CSI-RS resource for receiving or measuring a downlink signal.

To be specific, after the second determination unit 203 has determined the set of the positions of the CSI-RS resources corresponding to each type of the subframe to be the position of the CSI-RS resource for receiving or measuring the downlink signal, the signal processing unit 204 may receive or measure the downlink signal in one of the following two modes.

Mode 1: the signal processing unit 204 may acquire a union of the sets of the positions of the CSI-RS resources corresponding to the types of the subframes, and receive or measure the downlink signal in accordance with the union.

Mode 2: the signal processing unit 204 may receive or measure the downlink signal in accordance with the set of the positions of the CSI-RS resources corresponding to each type of subframe.

For example, in the case that a normal subframe corresponds to a set A of the positions of the CSI-RS resources, a special subframe corresponds to a set B of the positions of the CSI-RS resources and the UE receives or measures the downlink signal in mode 1 (i.e., a union C of the set A and the second B is acquired as the set of the positions of the CSI-RS resources), the UE may receive or measure the downlink signal according to the set C, so as to acquire a measurement result. In the case that the UE receives or measures the downlink signal in mode 2 (i.e., the UE receives or measures the downlink signal according to the set A and the UE receives or measures the downlink signal according to the set B), two measurement results corresponding to the set A and the set B respectively may be acquired.

Taking a LTE system supporting seven different uplink/downlink subframe configurations as an example, subframe 6 (for a radio subframe, the number of subframes starts from 0, so subframe 6 represents a seventh subframe) have different types in different uplink/downlink subframe configurations. For example, in an uplink/downlink subframe configuration 0, subframe 6 is a special subframe, and in an uplink/downlink subframe configuration 3, subframe 6 is a normal downlink subframe. The other subframes, e.g., subframe 0, are normal downlink subframes in different uplink/downlink subframe configurations. In other words, the UE may determine, in accordance with the uplink/downlink subframe configuration information, that merely subframe 6 within which the CSI-RS is to be transmitted is of various types. As a result, it is able to determine the position of the CSI-RS resource within subframe 6 using the above-mentioned method.

The CSI-RS includes a ZP CSI-RS, an NZP CSI-RS or both.

According to the embodiments of the present disclosure, the UE may determine the type of the subframe within which the CSI-RS is to be transmitted in accordance with the uplink/downlink subframe configuration notified by the base station, and then determine the position of the CSI-RS resource within the subframe in accordance with the type of the subframe. As a result, it is able for the UE to, in the case that the base station indicates the uplink/downlink subframe configurations of the UE via various signaling and the uplink/downlink subframe configurations are different from each other, determine the type of the subframe within which the CSI-RS is to be transmitted and determine the position of the CSI-RS resource within the subframe within which the CSI-RS is to be transmitted in a better manner.

Based on an identical inventive concept, the present disclosure further provides in some embodiments a device capable of implementing the above-mentioned method for determining the CSI-RS transmission resource.

As shown in FIG. 3, the device may include a processor 301, a memory 302, a transceiver 303 and a bus interface.

The processor 301 may take charge of managing the bus architecture as well as general processings. The memory 302 may store data desired for the operation of the processor 301. The transceiver 303 may receive and transmit data under the control of the processor 301.

The bus architecture may include a number of buses and bridges connected to each other, so as to connect various circuits for one or more processors such as the processor 301 and one or more memories such as the memory 302. In addition, as is known in the art, the bus architecture may be used to connect any other circuits, such as a circuit for a peripheral device, a circuit for a voltage stabilizer and a power management circuit, which are not further particularly defined herein. Bus interfaces are provided, and the transceiver 303 may consist of a plurality of elements, i.e., a transmitter and a receiver for communication with any other communication devices over a transmission medium. The processor 301 may take charge of managing the bus architecture as well as general processings. The memory 302 may store data desired for the operation of the processor 301.

The above method for determining the CSI-RS resource may be applied to, or implemented by, the processor 301. During the implementation, the steps of the method for determining the CSI-RS resource may be executed by an integrated logic circuit of hardware or software in the processor 301. The processor 301 may be a general-purpose processor, a Digital Signal Processor (DSP), an Application Specific Integrated Circuit (ASIC), a Field Programmable Gate Array (FPGA), or any other programmable logic element, discrete gate or transistor logic element, or discrete hardware assembly, so as to implement or execute the method, the steps and the procedures. The general-purpose processor may be a microprocessor or any other conventional processor. The steps of the method in the embodiments of the present disclosure may be executed by the processor directly, or by the processor in combination with software modules. The software modules may be located in a known storage medium such as a Random Access Memory (RAM), a flash memory, a Read Only Memory (ROM), a Programmable Read Only Memory (PROM) or Electrically Erasable Programmable Read Only Memory (EEPROM), or a register. The storage medium may be located within the memory 302, and the processor 301 may read information stored in the memory 302, so as to implement the steps of the above-mentioned method for determining the CSI-RS transmission resource in combination with the hardware.

To be specific, the processor 301 is further configured to read programs stored in the memory 302, so as to: acquire uplink/downlink subframe configuration information for determining a position of the CSI-RS resource; determine a type of a subframe within which the CSI-RS is to be transmitted in accordance with the uplink/downlink subframe configuration information; and determine the position of the CSI-RS resource within the subframe within which the CSI-RS is to be transmitted in accordance with the determined type of the subframe.

To be specific, the processor 301 is further configured to acquire the uplink/downlink subframe configuration information for determining the position of the CSI-RS resource using one or more types of signaling in accordance with an agreement with a system or UE-specific signaling from a base station.

To be specific, the processor 301 is further configured to acquire the uplink/downlink subframe configuration information for determining the position of the CSI-RS resource using one of broadcasting signaling from the base station, physical layer downlink signaling from the base station, and UE-specific high-layer signaling from the base station.

The step of acquiring, by the UE, the uplink/downlink subframe configuration information using the UE-specific high-layer signaling from the base station comprises: receiving, by the UE, the UE-specific high-layer signaling from the base station, the UE-specific high-layer signaling being used to indicate the UE to acquire the uplink/downlink subframe configuration information using the broadcasting signaling, the physical layer downlink signaling or both; and acquiring, by the UE, the uplink/downlink subframe configuration information using the broadcasting signaling or the physical layer downlink signaling in accordance with the UE-specific high-layer signaling.

To be specific, the UE is further configured to acquire the uplink/downlink subframe configuration information for determining the position of the CSI-RS resource using one or more of the above-mentioned three types of signaling based on the agreement with the system, or acquire the uplink/downlink subframe configuration information for determining the position of the CSI-RS resource using one or more of the above-mentioned three types of signaling based on the RRC signaling from the base station. For example, the UE may, based on the agreement with the system, determine the position of the CSI-RS resource merely in accordance with the uplink/downlink subframe configuration information acquired from the broadcasting signaling. For another example, the base station may notify, through the RRC signaling, the UE to determine the position of the CSI-RS resource in accordance with the uplink/downlink subframe configuration information acquired from the broadcasting signaling and the DCI. The RRC signaling may include signaling for determining the type of the subframe.

To be specific, one or more types of subframes within which the CSI-RSs are to be transmitted may be determined by the UE in accordance with the uplink/downlink subframe configuration information. For example, in the case that the UE acquires the uplink/downlink subframe configuration information merely via one of the broadcasting signaling, the physical layer downlink signaling and the high-layer signaling from the base station, the UE may determine that there is merely one type of subframe within which the CSI-RS is to be transmitted. In the case that the UE acquires the uplink/downlink subframe configuration information via more than one of the broadcasting signaling, the physical layer downlink signaling and the high-layer signaling from the base station, and the UE is notified of an identical uplink/downlink subframe configuration via these types of signaling, the UE may also determine that there is merely one type of subframe within which the CSI-RS is to be transmitted. In the case that the UE acquires the uplink/downlink subframe configuration information via more than one of the broadcasting signaling, the physical layer downlink signaling and the high-layer signaling from the base station, but the UE is notified of different uplink/downlink subframe configurations via these types of signaling, the UE may determine that there are various types of subframes within which the CSI-RS is to be transmitted.

In the case that one type of subframe within which the CSI-RS is to be transmitted is determined by the UE in accordance with the uplink/downlink subframe configuration information, the UE may determine the position of the CSI-RS resource in accordance with the one type of the subframe within which the CSI-RS is to be transmitted.

In addition, in the case that two or more types of subframes within which the CSI-RSs are to be transmitted are determined by the UE in accordance with the uplink/downlink subframe configuration information, the UE may determine the position of the CSI-RS resource in accordance with each type of the subframe, so as to acquire a set of positions of the CSI-RS resources corresponding to each type of the subframe, and determine the set of the positions of the CSI-RS resources corresponding to each type of the subframe to be the position of the CSI-RS resource for receiving or measuring a downlink signal.

Further, subsequent to determining the set of the positions of the CSI-RS resources corresponding to each type of the subframe to be the position of the CSI-RS resource for receiving or measuring the downlink signal, the UE may receive or measure the downlink signal in one of the following two modes. Mode 1: the UE may acquire a union of the sets of the positions of the CSI-RS resources corresponding to the types of the subframes, and receive or measure the downlink signal in accordance with the union. Mode 2: the UE may receive or measure the downlink signal in accordance with the set of the positions of the CSI-RS resources corresponding to each type of subframe.

The subframe within which the CSI-RS is to be transmitted is a seventh subframe of a radio frame. The CSI-RS includes a ZP CSI-RS, an NZP CSI-RS or both.

The present disclosure has been described with reference to the flow charts and/or block diagrams of the method, device (system) and computer program product according to the embodiments of the present disclosure. It should be understood that computer program instructions may be used to implement each of the work flows and/or blocks in the flow charts and/or the block diagrams, and the combination of the work flows and/or blocks in the flow charts and/or the block diagrams. These computer program instructions may be provided to a processor of a common computer, a dedicate computer, an embedded processor or any other programmable data processing devices to create a machine, so that instructions executable by the processor of the computer or the other programmable data processing devices may create a device to achieve the functions assigned in one or more work flows in the flow chart and/or one or more blocks in the block diagram.

These computer program instructions may also be stored in a computer readable storage that may guide the computer or the other programmable data process devices to function in a certain way, so that the instructions stored in the computer readable storage may create a product including an instruction unit which achieves the functions assigned in one or more flows in the flow chart and/or one or more blocks in the block diagram.

These computer program instructions may also be loaded in the computer or the other programmable data process devices, so that a series of operation steps are executed on the computer or the other programmable devices to create processes achieved by the computer. Therefore, the instructions executed in the computer or the other programmable devices provide the steps for achieving the function assigned in one or more flows in the flow chart and/or one or more blocks in the block diagram.

Although the preferred embodiments are described above, a person skilled in the art may make modifications and alterations to these embodiments in accordance with the basic concept of the present disclosure. So, the attached claims are intended to include the preferred embodiments and all of the modifications and alterations that fall within the scope of the present disclosure.

Obviously, a person skilled in the art may make further modifications and improvements without departing from the spirit of the present disclosure, and these modifications and improvements shall also fall within the scope of the present disclosure.

What is claimed is:

1. A method for determining a Channel State Information-Reference Signal (CSI-RS) transmission resource, comprising:

acquiring, by a User Equipment (UE), uplink/downlink subframe configuration information for determining a position of a CSI-RS resource;

determining, by the UE, a type of a subframe within which a CSI-RS is to be transmitted in accordance with the uplink/downlink subframe configuration information; and determining, by the UE, the position of the CSI-RS resource within the subframe within which the CSI-RS is to be transmitted in accordance with the determined type of the subframe, wherein one or more types of subframes within which the CSI-RS is to be transmitted are determined by the UE in accordance with the uplink/downlink subframe configuration information;

the step of determining, by the UE, the position of the CSI-RS resource within the subframe within which the CSI-RS is to be transmitted in accordance with the determined type of the subframe comprises:

in the case that one type of subframe within which the CSI-RS is to be transmitted is determined by the UE in accordance with the uplink/downlink subframe configuration information, determining, by the UE, the position of the CSI-RS resource in accordance with the one type of the subframe within which the CSI-RS is to be transmitted; and in the case that two or more types of subframes within which the CSI-RS is to be transmitted are determined by the UE in accordance with the uplink/downlink subframe configuration information, determining, by the UE, the position of the CSI-RS resource in accordance with each of the types of the subframes, to acquire a set of positions of the resources corresponding to each of the types of the subframes; and determining, by the UE, the set of the positions of the CSI-RS resources corresponding to each of the types of the subframes to be the position of the CSI-RS resource for receiving or measuring a downlink signal, wherein the method further comprises, subsequent to the step of determining, by the UE, the set of the positions of the CSI-RS resources corresponding to each of the types of the subframes to be the position of the CSI-RS resource for receiving or measuring the downlink signal:

acquiring, by the UE, a union of the sets of the positions of the CSI-RS resources corresponding to the types of the subframes, and receiving or measuring the downlink signal in accordance with the union; or receiving or measuring, by the UE, the downlink signal in accordance with the set of the positions of the CSI-RS resources corresponding to each of the types of subframes.

2. The method according to claim 1, wherein the UE acquires the uplink/downlink subframe configuration information for determining the position of the CSI-RS resource using one or more types of signaling in accordance with an agreement with a system or in accordance with UE-specific signaling from a base station.

3. The method according to claim 1, wherein the step of acquiring, by the UE, the uplink/downlink subframe configuration information for determining the position of the CSI-RS resource comprises:

acquiring, by the UE, the uplink/downlink subframe configuration information using one or any combination of: broadcasting signaling from a base station, physical layer downlink signaling from the base station, and UE-specific high-layer signaling from the base station.

4. The method according to claim 3, wherein the step of acquiring, by the UE, the uplink/downlink subframe configuration information using the UE-specific high-layer signaling from the base station comprising:

receiving, by the UE, the UE-specific high-layer signaling from the base station, the UE-specific high-layer signaling being used to indicate the UE to acquire the uplink/downlink subframe configuration information using the broadcasting signaling and/or the physical layer downlink signaling; and acquiring, by the UE, the uplink/downlink subframe configuration information using the broadcasting signaling and/or the physical layer downlink signaling in accordance with the UE-specific high-layer signaling.

5. The method according to claim 1, wherein the subframe within which the CSI-RS is to be transmitted is a seventh subframe in a radio frame.

6. The method according to claim 1, wherein the CSI-RS comprises a zero-power CSI-RS and/or a non-zero-power CSI-RS, and the determined type of the subframe comprises at least one of a normal uplink subframe, a normal downlink subframe and a special subframe.

7. A User Equipment (UE), comprising:

a processor;

a memory connected to the processor via a bus interface and configured to store therein programs and data for the operation of the processor; and a transceiver configured to be in communication with any other devices over a transmission medium, wherein the processor is configured to call and execute the programs and the data stored in the memory to:

acquire uplink/downlink subframe configuration information for determining a position of a Channel State Information-Reference Signal (CSI-RS) resource;

determine a type of a subframe within which a CSI-RS is to be transmitted in accordance with the uplink/downlink subframe configuration information; and determine the position of the CSI-RS resource within the subframe within which the CSI-RS is to be transmitted in accordance with the determined type of the subframe, wherein one or more types of subframes within which the CSI-RS is to be transmitted are determined by the first determination unit in accordance with the uplink/downlink subframe configuration information;

the processor is further configured to call and execute the programs and the data stored in the memory to:

in the case that one type of subframe within which the CSI-RS is to be transmitted is determined by the processor in accordance with the uplink/downlink subframe configuration information, determine the position of the CSI-RS resource in accordance with the one type of the subframe within which the CSI-RS is to be transmitted; and in the case that two or more types of subframes within which the CSI-RS is to be transmitted are determined by the processor in accordance with the uplink/downlink subframe configuration information, determine the position of the CSI-RS resource in accordance with each of the types of the subframes, to acquire a set of positions of the resources corresponding to each of the types of the subframes; and determine the set of the positions of the CSI-RS resources corresponding to each of the types of the subframes to be the position of the CSI-RS resource for receiving or measuring a downlink signal, wherein the processor is further configured to call and execute the programs and the data stored in the memory to, subsequent to determining, by the processor, the set of the positions of the CSI-RS resources corresponding to each of the types of the subframes to be the position of the CSI-RS resource for receiving or measuring the downlink signal;

acquire a union of the sets of the positions of the CSI-RS resources corresponding to the types of the subframes, and receive or measure the downlink signal in accordance with the union; or receive or measure the downlink signal in accordance with the set of the positions of the CSI-RS resources corresponding to each of the types of the subframes.

8. The UE according to claim 7, wherein the processor is further configured to call and execute the programs and the data stored in the memory to: acquire the uplink/downlink subframe configuration information for determining the position of the CSI-RS resource using one or more types of signaling in accordance with an agreement with a system or in accordance with UE-specific signaling from a base station.

9. The UE according to claim 7, wherein the processor is further configured to call and execute the programs and the data stored in the memory to: acquire the uplink/downlink subframe configuration information using one or any combination of: broadcasting signaling from the base station, physical layer downlink signaling from the base station, and UE-specific high-layer signaling from the base station.

10. The UE according to claim 9, wherein the processor is further configured to call and execute the programs and the data stored in the memory to: receive the UE-specific high-layer signaling from the base station, the UE-specific high-layer signaling being used to indicate the UE to acquire the uplink/downlink subframe configuration information using the broadcasting signaling and/or the physical layer downlink signaling; and acquire the uplink/downlink subframe configuration information using the broadcasting signaling and/or the physical layer downlink signaling in accordance with the UE-specific high-layer signaling.

11. The UE according to claim 7, wherein the subframe within which the CSI-RS is to be transmitted is a seventh subframe in a radio frame.

12. The UE according to claim 7, wherein the CSI-RS comprises a zero-power CSI-RS and/or a non-zero-power CSI-RS, and the determined type of the subframe comprises at least one of a normal uplink subframe, a normal downlink subframe and a special subframe.

* * * * *